United States Patent
Park et al.

(10) Patent No.: US 8,522,164 B2
(45) Date of Patent: Aug. 27, 2013

(54) PORTABLE TERMINAL AND DISPLAY METHOD AND MEDIUM THEREFOR

(75) Inventors: Joonah Park, Seoul (KR); Seongwoon Kim, Yongin-si (KR); Yeunbae Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 734 days.

(21) Appl. No.: 12/007,471

(22) Filed: Jan. 10, 2008

(65) Prior Publication Data

US 2008/0189635 A1 Aug. 7, 2008

(30) Foreign Application Priority Data

Feb. 2, 2007 (KR) .................. 10-2007-0011278

(51) Int. Cl.
*G06F 3/048* (2006.01)
*G09G 5/00* (2006.01)

(52) U.S. Cl.
USPC .......................................... 715/835; 345/1.3

(58) Field of Classification Search
USPC ................. 715/810, 825, 835, 839, 840, 841, 715/853, 854; 345/168, 1.3; 707/745, E17.019
See application file for complete search history.

(56) References Cited

U.S. PATENT DOCUMENTS

| | | | |
|---|---|---|---|
| 6,335,742 B1 | 1/2002 | Takemoto | |
| 6,670,950 B1 * | 12/2003 | Chin et al. | 345/173 |
| 6,834,294 B1 * | 12/2004 | Katz | 709/203 |
| 7,043,276 B2 * | 5/2006 | Kokubo | 455/566 |
| 7,107,516 B1 * | 9/2006 | Anderson et al. | 715/210 |
| 7,486,279 B2 * | 2/2009 | Wong et al. | 345/173 |
| 2004/0125078 A1 * | 7/2004 | Nishimori et al. | 345/156 |
| 2005/0234896 A1 * | 10/2005 | Shima et al. | 707/3 |
| 2006/0092038 A1 * | 5/2006 | Unger | 340/825.25 |
| 2006/0187867 A1 * | 8/2006 | Panje | 370/315 |
| 2006/0209089 A1 | 9/2006 | Date | |
| 2006/0221059 A1 | 10/2006 | Choi et al. | |
| 2006/0230334 A1 * | 10/2006 | Slawson et al. | 715/500.1 |
| 2007/0035523 A1 * | 2/2007 | Cohen | 345/169 |
| 2007/0075915 A1 * | 4/2007 | Cheon et al. | 345/1.1 |
| 2007/0237515 A1 * | 10/2007 | Wahlstrom | 396/287 |
| 2007/0255742 A1 * | 11/2007 | Perez et al. | 707/102 |
| 2007/0293273 A1 * | 12/2007 | Rochford | 455/566 |
| 2007/0294242 A1 | 12/2007 | Watanabe et al. | |

(Continued)

FOREIGN PATENT DOCUMENTS

| | | |
|---|---|---|
| JP | 2004-86260 | 3/2004 |
| JP | 2006-202301 | 8/2006 |

(Continued)

OTHER PUBLICATIONS

Flickr, 2004, http://web.archive.org/web/20041114043009/http://flickr.com/photos/tags/.*
Japanese Office Action issued Feb. 19, 2013 in Japanese Patent Application No. 2008-022432.

*Primary Examiner* — Matt Kim
*Assistant Examiner* — Ryan Barrett
(74) *Attorney, Agent, or Firm* — Staas & Halsey LLP

(57) ABSTRACT

Provided are a portable terminal and display method and medium therefore for arranging a plurality of prepared tags according to a predetermined standard and displaying the plurality of prepared tags on a main display unit; and displaying one or more pieces of contents having a selected tag among the prepared tags among a plurality of pieces of prepared contents on a plurality of buttons.

14 Claims, 3 Drawing Sheets

(56) References Cited

U.S. PATENT DOCUMENTS

| | | | | |
|---|---|---|---|---|
| 2008/0059906 | A1* | 3/2008 | Toki | 715/810 |
| 2008/0072145 | A1* | 3/2008 | Blanchard et al. | 715/273 |
| 2008/0114778 | A1* | 5/2008 | Siegel | 707/100 |
| 2008/0126191 | A1* | 5/2008 | Schiavi | 705/14 |

FOREIGN PATENT DOCUMENTS

| | | |
|---|---|---|
| JP | 2006-202302 | 8/2006 |
| JP | 2006-227692 | 8/2006 |
| JP | 2006-304291 | 11/2006 |
| KR | 10-2006-0106771 | 10/2006 |

\* cited by examiner

PORTABLE TERMINAL AND DISPLAY METHOD AND MEDIUM THEREFOR

CROSS-REFERENCE TO RELATED APPLICATIONS

This application claims the priority benefit of Korean Patent Application No. 10-2007-0011278, filed on Feb. 2, 2007, in the Korean Intellectual Property Office, the disclosure of which is incorporated herein in its entirety by reference.

BACKGROUND

1. Field

Embodiments relate to a portable terminal, and more particularly, to a terminal for searching and displaying contents.

2. Description of the Related Art

Users can use portable terminals (portable device) such as mobile phones, portable media players (PMPs), personal digital assistants (PDAs), or digital cameras to create various pieces of content. Examples of content are photos, video, music, and the like. Since ordinary users, and not just professional content creators, can easily share their content online, there has been an increasing desire among users to create their own content.

Accordingly, since a variety of content is created using portable terminals, a method and medium for more easily retrieving specific contents through portable terminals is needed.

SUMMARY

Embodiments provide a portable terminal that allows a user to more easily search for content among various pieces of content stored thereon.

Embodiments also provide a display method and medium for a portable terminal that allows a user to more easily search for content among various pieces of content stored thereon.

Embodiments also provide a computer readable recording medium storing a program for executing methods of embodiments.

According to one aspect of embodiments, there is provided a portable terminal, including a main display unit to arrange a plurality of prepared tags according to a predetermined standard and to display the prepared tags; and a plurality of buttons displaying one or more pieces of contents having a selected tag among the prepared tags displayed on the main display unit among a plurality of pieces of prepared contents.

According to one aspect of embodiments, there is provided a portable terminal, including a main display unit to display a piece of prepared contents; and a plurality of buttons to display one or more tags of the piece of prepared contents displayed on the main display unit among a plurality of prepared tags.

According to another aspect of embodiments, there is provided a display method performed in a portable terminal including a main display unit and a plurality of buttons, the method including arranging a plurality of prepared tags according to a predetermined standard and displaying the plurality of prepared tags on the main display unit; and displaying one or more pieces of contents having a selected tag among the plurality of prepared tags among a plurality of pieces of prepared contents on the plurality of buttons.

According to another aspect of embodiments, there is provided a display method performed in a portable terminal including a main display unit and a plurality of buttons, the method including displaying a piece of prepared contents on the main display unit; and displaying one or more tags of the piece of prepared contents displayed on the main display unit among a plurality of prepared tags on the plurality of buttons.

According to another aspect of embodiments, there is provided a portable terminal including a main display unit to display a plurality of prepared tags in a predetermined arrangement; and a plurality of buttons to display one or more pieces of contents having a selected tag among the prepared tags displayed on the main display unit among a plurality of pieces of prepared contents.

According to another aspect of embodiments, there is provided a computer-readable recording medium having stored thereon a computer program for executing a display method performed in a portable terminal including a main display unit and a plurality of buttons, the method including arranging a plurality of prepared tags according to a predetermined standard and displaying the plurality of prepared tags on the main display unit; and displaying one or more pieces of contents having a selected tag among the plurality of prepared tags among a plurality of pieces of prepared contents on the plurality of buttons.

According to another aspect of embodiments, there is provided a computer-readable recording medium having stored thereon a computer program for executing a display method performed in a portable terminal including a main display unit and a plurality of buttons, the method including displaying a piece of prepared contents on the main display unit; and displaying one or more tags of the piece of prepared contents displayed on the main display unit among a plurality of prepared tags on the plurality of buttons.

According to another aspect, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1:
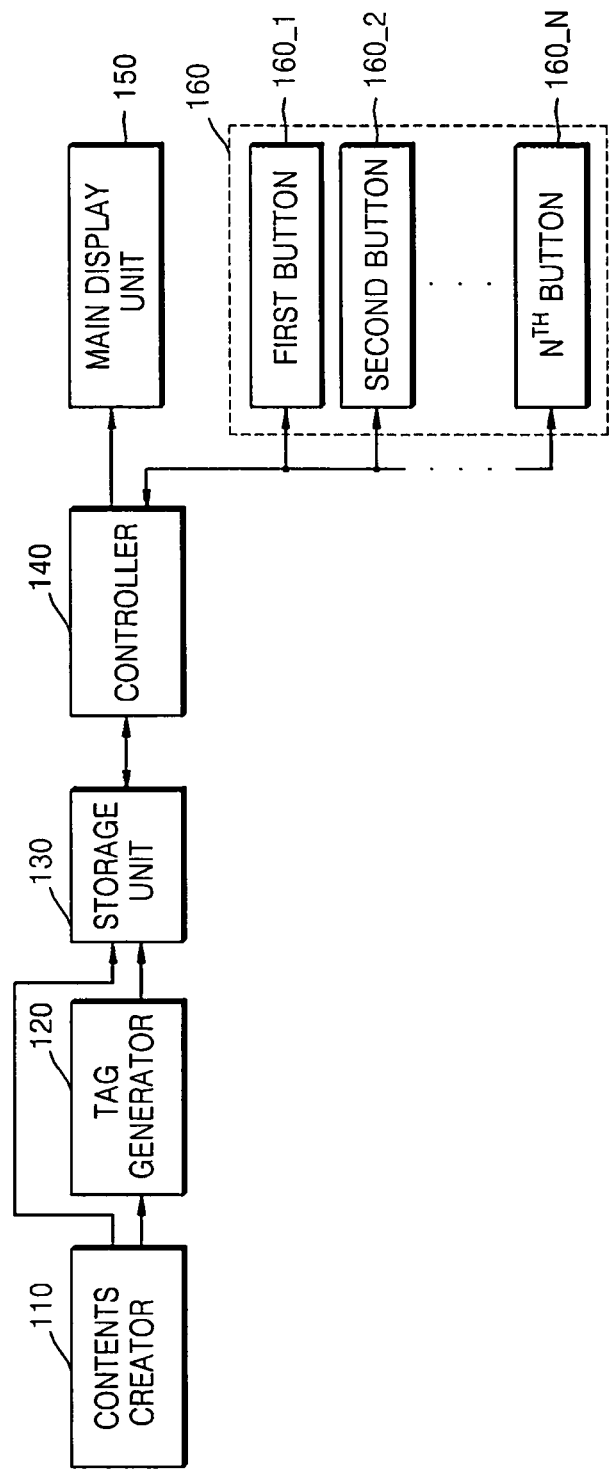
FIG. 1 is a block diagram of a portable terminal according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a block diagram of a portable terminal according to an exemplary embodiment. Referring to FIG. 1, the portable terminal may comprise a contents creator 110, a tag generator 120, a storage unit 130, a controller 140, a main display unit 150, and a plurality of buttons 160. The controller 140, the main display unit 150, and the buttons 160 may be included in a portable terminal (portable device) such as a mobile phone, digital camera, portable media player (PMP), or a personal digital assistant (PDA), whereas the contents creator 110, the tag generator 120, and the storage unit 130 may be embedded in the portable terminal or externally provided (e.g., connected to the portable terminal over a network). For the convenience of description, however, the contents creator 110, the tag generator 120, and the storage unit 130 are embedded in the portable terminal.

The contents creator 110 creates contents that can be reproduced by the portable terminal. Examples of contents are photos, video, music, and the like. When contents are created, the contents creator 110 controls the operation of the tag generator 120.

The tag generator 120 generates one or more tags that match the contents created by the contents creator 110. Tags are information being considered keywords of the contents.

The tag generator 120 can generate a tag that is thought of by a user (e.g., contents creator) who operates the portable terminal, according to the operation of buttons. The tag generated by the tag generator 120 is a word that is considered by a creator of the contents to be a keyword of contents. The tag is generally information determined subjectively based on the contents creator.

The tag generator 120 can automatically generate a tag according to a predetermined process irrespective of a user's intention. For example, the tag generator 120 can generate a tag indicating the date on which contents are created or a tag indicating its position coordinate found through a global positioning system (GPS) of the portable terminal including the contents creator 110. In this regard, the user is not aware of the generation of the tag.

The storage unit 130 matches the contents created by the contents creator 110 and the one or more tags generated by the tag generator 120, and stores the matched contents and tags. In the present exemplary embodiment, a tag of the contents is a tag matching the contents.

In this way, the storage unit 130 can store a plurality of pieces of contents and a plurality of tags matching the contents. In this regard, the storage unit 130 may store arrangement information necessary for arranging the plurality of tags. There are various types of arrangement information. For example, the arrangement information can be information indicating that a plurality of tags are arranged in alphabetical order, or in order of generation. The storage unit 130 can store a plurality of pieces of arrangement information.

The controller 140 can provide the main display unit 150 with a plurality of prepared tags and a plurality of pieces of prepared arrangement information and provide the buttons 160 with one or more pieces of prepared contents, or provide the main display unit 150 with prepared contents and provide the buttons 160 with one or more prepared tags. As indicated above, the prepared tags are stored in the storage unit 130, and the prepared arrangement information is stored in the storage unit 130. The controller 140 reads the at least one tag, arrangement information, or contents from the storage unit 130 to provide the buttons 160 with them.

The main display unit 150 corresponds to a main window of the portable terminal. The buttons 160 correspond to sub windows of the portable terminal. The main display unit 150 and the buttons 160 have a display function. The buttons 160 includes a first button 160-1, a second button 160-2, ... and an $N^{th}$ button 160-N (N is an integer greater than 2). The portable terminal can include the buttons 160 having the display function and a button (not shown) having no display function as well.

The operation of the main display unit 150 and the buttons 160 will now be described in more detail.

The main display unit 150 arranges the plurality of prepared tags according to a predetermined standard, and displays the arranged tags. In more detail, the main display unit 150 arranges the plurality of prepared tags based on the prepared arrangement information, and displays the arranged tags. The arrangement information provided by the controller 140, i.e., the arrangement information on which the main display unit 150 is based, may be selected by the user from the arrangement information stored in the storage unit 130. If the storage unit 130 stores both "arrangement information indicating that the plurality of tags are arranged in alphabetical order" and "arrangement information indicating that the plurality of tags are arranged in the order of their generation", the user who prefers the plurality of tags arranged in alphabetical order to the plurality of tags arranged in the order of their generation can properly operate the buttons of the portable terminal to instruct the main display unit 150 to be based on the "arrangement information indicating that the plurality of tags are arranged in alphabetical order".

If the tags stored in the storage unit 130 cannot be displayed on the main display unit 150 at the same time, the main display unit 150 can first display some of the tags, and, if the user operates a button such as a direction key, it can then display the other tags. The direction key can be a button 160-$n$ (n is an integer $1 \leq n \leq N$) having the display function, or a button having no display function.

If the main display unit 150 displays the plurality of tags, the user may select a "tag that is supposed to be included in specific contents to be searched among the prepared contents" from the displayed tags. To this end, the user can operate the button such as the direction key. Even if the user does not select a tag from the displayed tags, one of the displayed tags, e.g., a first tag of the displayed tags, is set as default.

When the main display unit 150 displays the plurality of tags, the buttons 160 displays one or more pieces of contents having "a tag selected from the displayed tags" among the plurality of pieces of prepared contents. In this regard, the main display unit 150 and the buttons 160 may simultaneously operate. If the button 160-$n$ displays a photo, the photo is displayed in the form of a thumbnail image. If the button 160-$n$ displays video, a still image of the video is displayed in the form of the thumbnail image. If the button 160-$n$ displays music, information, e.g., a title of the music, on the music is displayed.

If the plurality of contents displayed on the buttons 160 does not include content that the user is searching for, the user operates the button such as the direction key to select a tag other than the currently selected tag. In this regard, the buttons 160 displays one or more pieces of contents having the "tag" selected by the user among the plurality of pieces of prepared contents. As mentioned above, when the main display unit 150 displays the plurality of tags based on the arrangement information that the user prefers, the user may select a tag to be displayed closest to the currently selected tag.

If the plurality of contents displayed on the buttons 160 includes content for which the user searches, the user operates a button on which the contents are displayed to select the contents. In this regard, the main display unit 150 does not display the tags any longer but displays an enlarged version of the contents for which the user searches. At the same time, the buttons 160 does not display the contents any longer but displays one or more tags of the contents for which the user searches.

Thereafter, if the user selects a tag from the tags displayed on the buttons 160, the main display unit 150 does not display the contents any longer but displays the plurality of tags including the tag selected by the user among the plurality of prepared tags, and the buttons 160 does not display the tags any longer but displays one or more pieces of contents having the tag selected by the user among the plurality of pieces of prepared contents.

The operations of the controller 140, the main display unit 150, and the buttons 160 may be initiated when the user who searches for one of the contents stored in the storage unit 130 using the portable terminal operates a search instruction button (not shown) of the portable terminal, and terminated when the user does not operate a button of the portable terminal after a predetermined threshold time has elapsed. The search instruction button (not shown) can be a button having the display function such as the button 160-n or a button having no display function.

FIGS. 2A through 2D illustrate views for explaining portable terminals according to an exemplary embodiment. The portable terminals of the present exemplary embodiment are slide type mobile phones. Each portable terminal includes an upper body 210 and a lower body 220 when a user slides it open. The upper body 210 includes a main display unit 230. The lower body 220 includes a plurality of buttons 240.

Figure 2A:
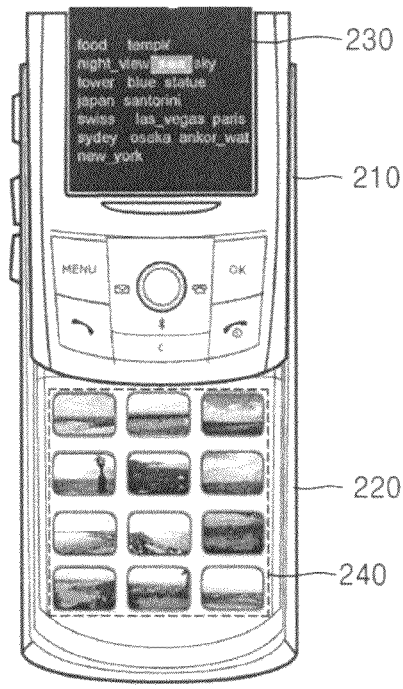
FIGS. 2A through 2D illustrate views for explaining portable terminals according to an exemplary embodiment.

Referring to FIG. 2A, the main display unit 230 displays a plurality of prepared tags (food, temple, night_view, sea, sky, tower, blue, statue, Japan, santorini, swiss, las_vegas, paris, sydey, osaka, ankor_wat, and new_york). The plurality of prepared tags are arranged according to arrangement information on which the main display unit 230 is based. Since the tag "sea" is selected, the buttons 240 can display 12 pieces of contents having the tag "sea" among a plurality of pieces of prepared contents.

Figure 2B:
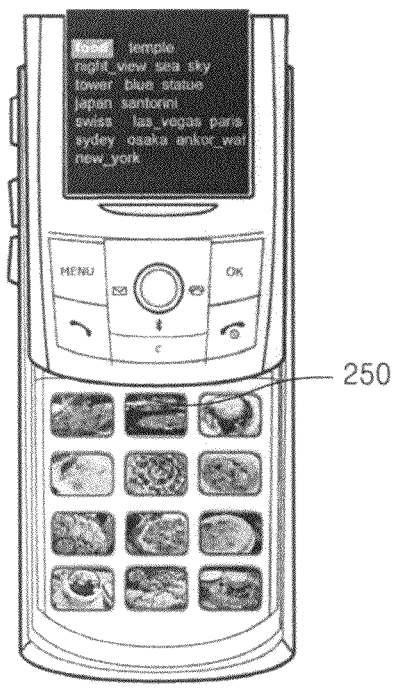

Likewise, referring to FIG. 2B, if the tag "food" is selected, the buttons 240 can display 12 pieces of contents having the tag "food" among the plurality of pieces of prepared contents.

If a button 250 displays contents for which the user searches, the user can operate the button 250 to select the contents. In this regard, referring to FIG. 2C, the main display unit 230 displays an enlarged version of the contents selected by the user, and the buttons 240 displays one or more tags (food, Japan, Appetizers, and kanbariya) of the contents selected by the user.

The user can search contents relating to the selected contents while seeing the main display unit 230 and the buttons 240. For example, if the selected contents are a photo of food the user had while the user traveled in Japan, the user accidentally wants to see a photo relating to the photo of food among photos taken at that time and searches for the photo.

Figure 2C:
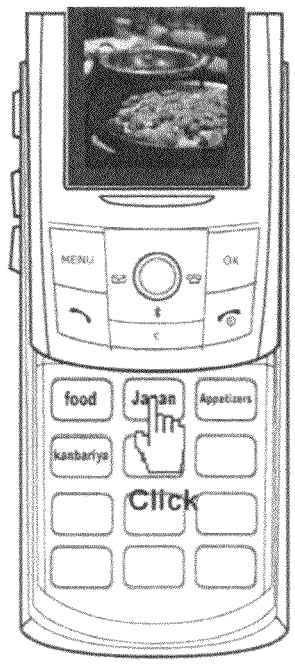
Figure 2D:

The user selects the tag "Japan" from the tags shown in FIG. 2C. Referring to FIG. 2D, the main display unit 230 displays a plurality of tags including the tag "Japan" among the plurality of prepared tags, and the buttons 240 display 12 pieces of contents having the tag "Japan" among the prepared tags. If a button 260 displays content that is the photo for which the user is searching, the user operates the button 260 to select the photo. The main display unit 230 displays an enlarged version of the photo, and the buttons 240 display one or more tags of the photo.

Figure 3:
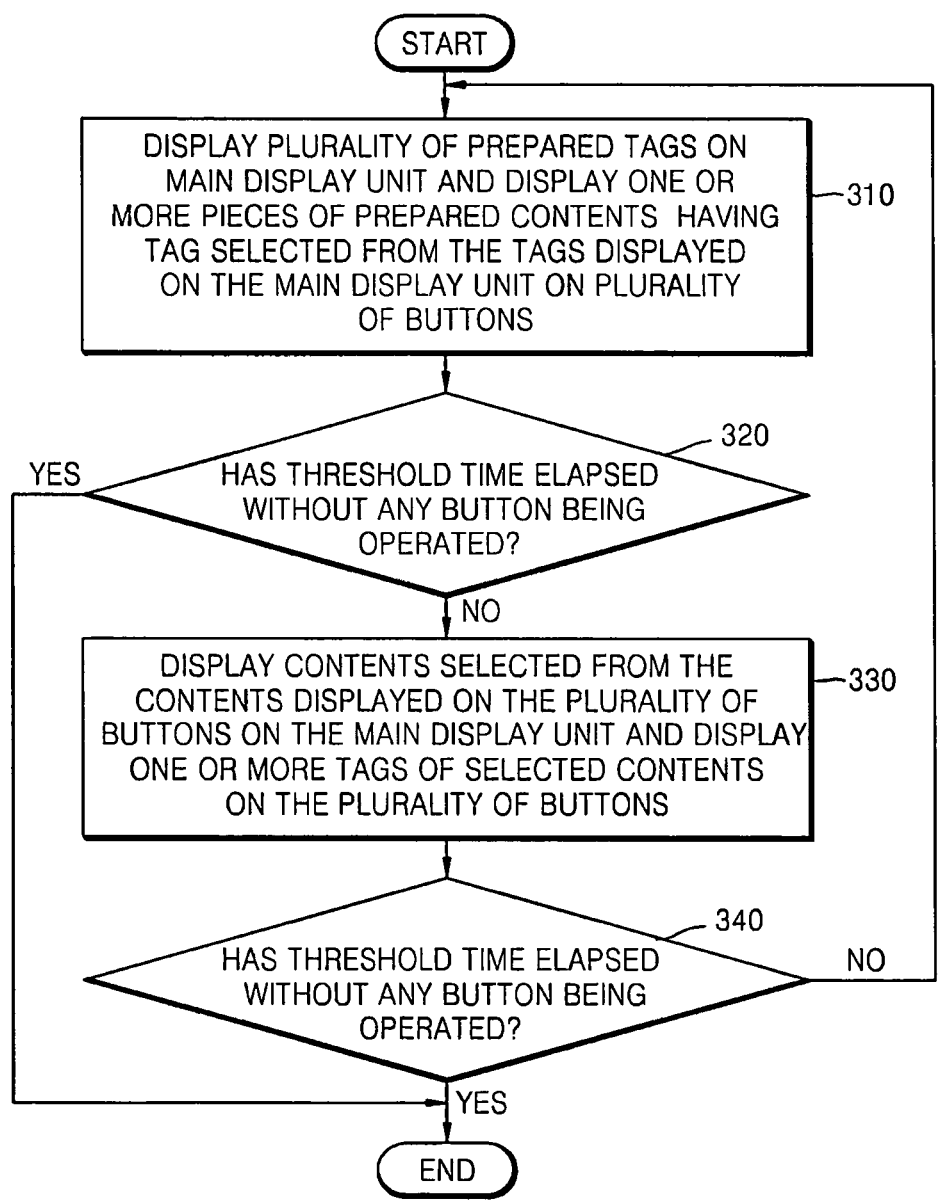
FIG. 3 is a flowchart of a display method according to an exemplary embodiment.

FIG. 3 is a flowchart of a display method according to an exemplary embodiment. The display method of the present exemplary embodiment includes operations 310 through 340 of more easily searching contents for which a user searches among a plurality of pieces of prepared contents over a portable terminal.

The main display unit 150 displays a plurality of prepared tags, and the buttons 160 display one or more pieces of prepared contents having a tag selected from the tags displayed on the main display unit 150 (Operation 310).

The controller 140 does not operate a button of the portable terminal but determines whether a threshold time has elapsed (Operation 320).

If the controller 140 determines that the threshold time has not elapsed, the main display unit 150 displays the contents selected from the contents displayed on the buttons 160, and the buttons 160 display one or more tags of the selected contents (Operation 330).

The controller 140 does not operate a button of the portable terminal but determines whether the threshold time has elapsed (Operation 340).

If the controller 140 determines that the threshold time has not elapsed, the procedure proceeds with Operation 310.

If the controller 140 determines that the threshold time has elapsed in Operation 320 or 340, the procedure ends.

In addition to the above-described exemplary embodiments, exemplary embodiments can also be implemented by executing computer readable code/instructions in/on a medium/media, e.g., a computer readable medium/media, to control at least one processing element to implement any exemplary embodiment. The medium/media can correspond to any medium/media permitting the storing of the computer readable code/instructions. The medium/media may also include, alone or in combination with the computer readable code/instructions, data files, data structures, and the like. In addition, code/instructions may include functional programs and code segments.

The computer readable code/instructions can recorded in/on a medium/media in a variety of ways, with examples of the medium/media including recording media such as magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories. The medium/media may also be a distributed network, so that the computer readable code/instructions are stored and executed in a distributed fashion. The computer readable code/instructions may be executed by one or more processing elements. Still further, as only an example, a processing element could include a processor or a computer processor, and processing elements may be distributed and/or included in a single device. Still further, as only an example, the computer readable code/instructions may also be executed and/or embodied in at least one application specific integrated circuit (ASIC) or Field Programmable Gate Array (FPGA). An ASIC or an FPGA may include one or more processing elements The computer readable code/instructions and computer readable medium/media may be those specially designed and constructed for the purposes of embodiments, or they may be of the kind well-known and available to those skilled in the art of computer hardware and/or computer software.

In addition, one or more software modules or one or more hardware modules may be configured in order to perform the operations of the above-described exemplary embodiments.

The term "module", as used herein [when used in connection with execution of code/instructions], denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processing element (e.g., a processor) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processing elements (e.g., processors).

As described above, the portable terminal and display method and medium therefore of embodiments allocate one or more tags to each piece of contents that are displayed on the portable terminal, display a plurality of prepared tags on a main display unit corresponding to a main window of the portable terminal, and at the same time, automatically display one or more pieces of contents, in the form of a thumbnail image, having the displayed tags on a plurality of buttons corresponding to sub windows of the portable terminal in which the displayed contents are selected by a user from a plurality of pieces of prepared contents inside or outside the portable terminal, so that the user can automatically see the displayed contents without displaying each of the pieces of prepared contents on the main display unit, thereby more easily searching contents for which the user searches among the pieces of prepared contents over the portable terminal. The user operates a button that displays the contents for which the user searches to allow the main display unit to display the contents, so that the user can more easily search the contents among the pieces of prepared contents by a simple operation of the button and that the main display unit can display the contents.

Furthermore, if the main display unit displays contents, the portable terminal and display method and medium of embodiments, automatically display tags of the contents displayed on the main display unit on the buttons, so that a user who searches for specific content relating to the displayed contents among the pieces of prepared contents selects one of the tags displayed on the buttons to allow the main display unit to display a plurality of tags including the tag selected by the user among the prepared tags and to allow the buttons to display contents having the selected tag, thereby more easily searching the specific contents through the portable terminal.

Although a few exemplary embodiments have been shown and described, it would be appreciated by those skilled in the art that changes may be made in these exemplary embodiments, the scope of which is defined in the claims and their equivalents.

What is claimed is:

1. A portable terminal, comprising:
    a main display unit to arrange a plurality of prepared tags and to display the prepared tags;
    a tag generator to generate the prepared tags that match a plurality of pieces of prepared contents, wherein the prepared tags are information being considered keywords of the prepared contents; and
    a plurality of buttons to display one or more pieces of contents having a selected tag among the prepared tags displayed on the main display unit among the plurality of pieces of prepared contents,
    wherein the main display unit displays an enlarged version of a content selected among the one or more pieces of contents displayed on the plurality of buttons by operating the button displaying the selected content, and the plurality of buttons display one or more tags of the selected content,
    wherein the main display unit is physically separated from the plurality of buttons, and
    wherein each of the plurality of the buttons is a display.

2. The portable terminal of claim 1, wherein each of the pieces of prepared contents has one or more tags that are generated according to the manipulation of the portable terminal.

3. The portable terminal of claim 1, wherein each of the pieces of prepared contents has one or more tags that are automatically generated according to a date on which contents are created or according to a position coordinate from a global positioning system of the portable terminal.

4. The portable terminal as recited in claim 1, wherein the plurality of prepared tags are displayed in a predetermined arrangement.

5. The portable terminal as recited in claim 4, wherein the predetermined arrangement of prepared tags is alphabetical order or order in which the prepared tags were created.

6. A display method performed in a portable terminal comprising a main display unit and a plurality of buttons, the method comprising:
    arranging a plurality of prepared tags and displaying the plurality of prepared tags on the main display unit;
    selecting a tag among the plurality of prepared tags;
    displaying one or more pieces of contents having the selected tag among the plurality of prepared tags among a plurality of pieces of prepared contents on the plurality of buttons;
    displaying, on the main display unit, an enlarged version of a content selected among the one or more pieces of contents displayed on the plurality of buttons by operating the button displaying the selected content; and
    displaying one or more tags of the selected content on the plurality of buttons,
    wherein the main display unit is physically separated from the plurality of buttons, and
    wherein each of the plurality of the buttons is a display.

7. The method of claim 6, wherein each of the pieces of prepared contents has one or more tags that are generated according to the manipulation of the portable terminal.

8. The method of claim 6, further comprising:
    displaying a plurality of tags including a tag selected from the one or more tags on the main display unit, wherein the tag selected from the one or more tags is selected by operating the button displaying the tag selected from the one or more tags, and
    displaying, on the plurality of buttons, one or more pieces of contents having the tag selected from the one or more tags.

9. The method of claim 6, wherein each of the pieces of prepared contents has one or more tags that are automatically generated according to a date on which contents are created or according to a position coordinate from a global positioning system of the portable terminal.

10. The method of claim 6, wherein the plurality of prepared tags are displayed in a predetermined arrangement.

11. The method of claim 10, wherein the predetermined arrangement of prepared tags is alphabetical order or order in which the prepared tags were created.

12. At least one non-transitory computer readable recording medium storing instructions that control at least one processing element to perform a method in a portable terminal comprising a main display unit and a plurality of buttons, the method comprising:

arranging a plurality of prepared tags and displaying the plurality of prepared tags on the main display unit;

selecting a tag among the plurality of prepared tags;

displaying one or more pieces of contents having the selected tag among the plurality of prepared tags among a plurality of pieces of prepared contents on the plurality of buttons;

displaying, on the main display unit, an enlarged version of a content selected among the one or more pieces of contents displayed on the plurality of buttons by operating the button displaying the selected content; and displaying one or more tags of the selected content on the plurality of buttons, wherein the main display unit is physically separated from the plurality of buttons, and wherein each of the plurality of the buttons is a display.

13. At least one non-transitory computer readable medium as recited in claim 12, wherein each of the pieces of prepared contents has one or more tags that are generated according to the manipulation of the portable terminal.

14. At least one non-transitory computer readable medium as recited in claim 12, wherein each of the pieces of prepared contents has one or more tags that are automatically generated according to a date on which contents are created or according to a position coordinate from a global positioning system of the portable terminal.

\* \* \* \* \*